Figure 1:
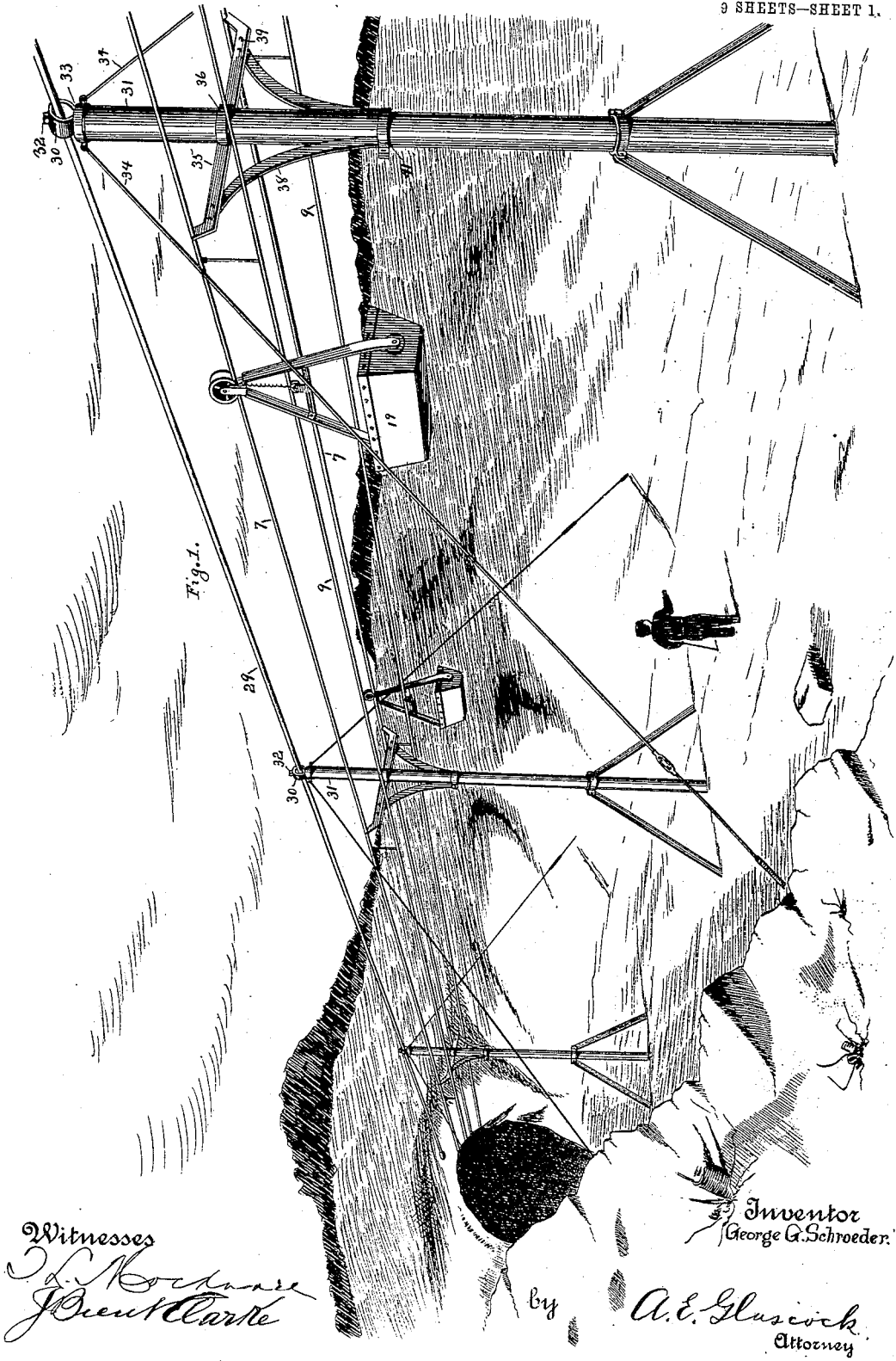

No. 841,582. PATENTED JAN. 15, 1907.
G. G. SCHROEDER.
AERIAL SYSTEM FOR MINING PURPOSES.
APPLICATION FILED OCT. 10, 1904. RENEWED JUNE 25, 1906.

9 SHEETS—SHEET 1.

No. 841,582. PATENTED JAN. 15, 1907.
G. G. SCHROEDER.
AERIAL SYSTEM FOR MINING PURPOSES.
APPLICATION FILED OCT. 10, 1904. RENEWED JUNE 25, 1906.

9 SHEETS—SHEET 2.

Witnesses
J. Brent Clarke
Florence L. Metz

Inventor
George G. Schroeder.
By A. E. Glascock
Attorney

No. 841,582. PATENTED JAN. 15, 1907.
G. G. SCHROEDER.
AERIAL SYSTEM FOR MINING PURPOSES.
APPLICATION FILED OCT. 10, 1904. RENEWED JUNE 25, 1906.

9 SHEETS—SHEET 3.

Witnesses

Inventor
George G. Schroeder.
by A. E. Glascock
Attorney

No. 841,582. PATENTED JAN. 15, 1907.
G. G. SCHROEDER.
AERIAL SYSTEM FOR MINING PURPOSES.
APPLICATION FILED OCT. 10, 1904. RENEWED JUNE 25, 1906.

9 SHEETS—SHEET 4.

Witnesses
Inventor
George G. Schroeder.
by A. E. Glascock
Attorney

No. 841,582. PATENTED JAN. 15, 1907.
G. G. SCHROEDER.
AERIAL SYSTEM FOR MINING PURPOSES.
APPLICATION FILED OCT. 10, 1904. RENEWED JUNE 25, 1906.

9 SHEETS—SHEET 5.

Witnesses

Inventor
George G. Schroeder.
by A. E. Glascock
Attorney

No. 841,582. PATENTED JAN. 15, 1907.
G. G. SCHROEDER.
AERIAL SYSTEM FOR MINING PURPOSES.
APPLICATION FILED OCT. 10, 1904; RENEWED JUNE 25, 1906.
9 SHEETS—SHEET 6.
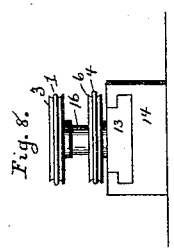
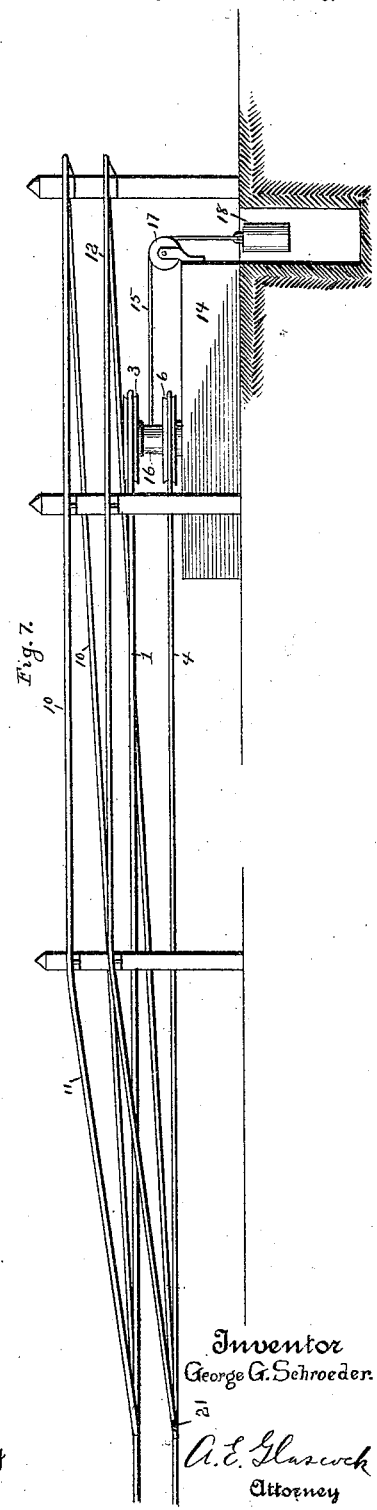
Inventor
George G. Schroeder.

No. 841,582. PATENTED JAN. 15, 1907.
G. G. SCHROEDER.
AERIAL SYSTEM FOR MINING PURPOSES.
APPLICATION FILED OCT. 10, 1904. RENEWED JUNE 25, 1906.
9 SHEETS—SHEET 7.
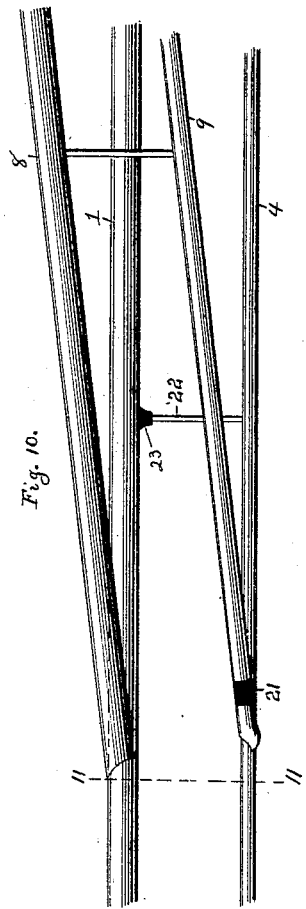
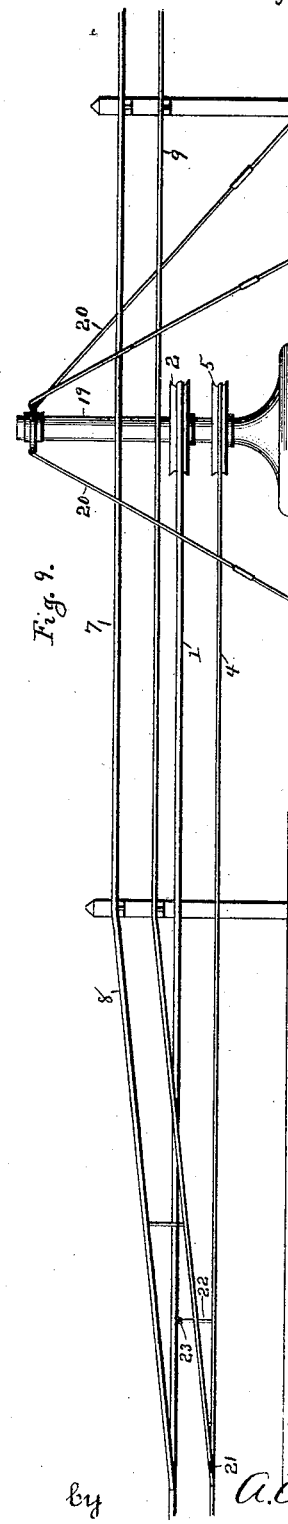
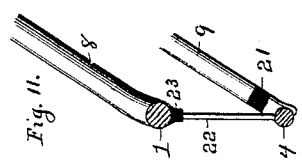
Inventor
George G. Schroeder
by A. E. Glascock
Attorney
Witnesses No. 841,582. PATENTED JAN. 15, 1907.
G. G. SCHROEDER.
AERIAL SYSTEM FOR MINING PURPOSES.
APPLICATION FILED OCT. 10, 1904. RENEWED JUNE 25, 1906.
9 SHEETS—SHEET 8.
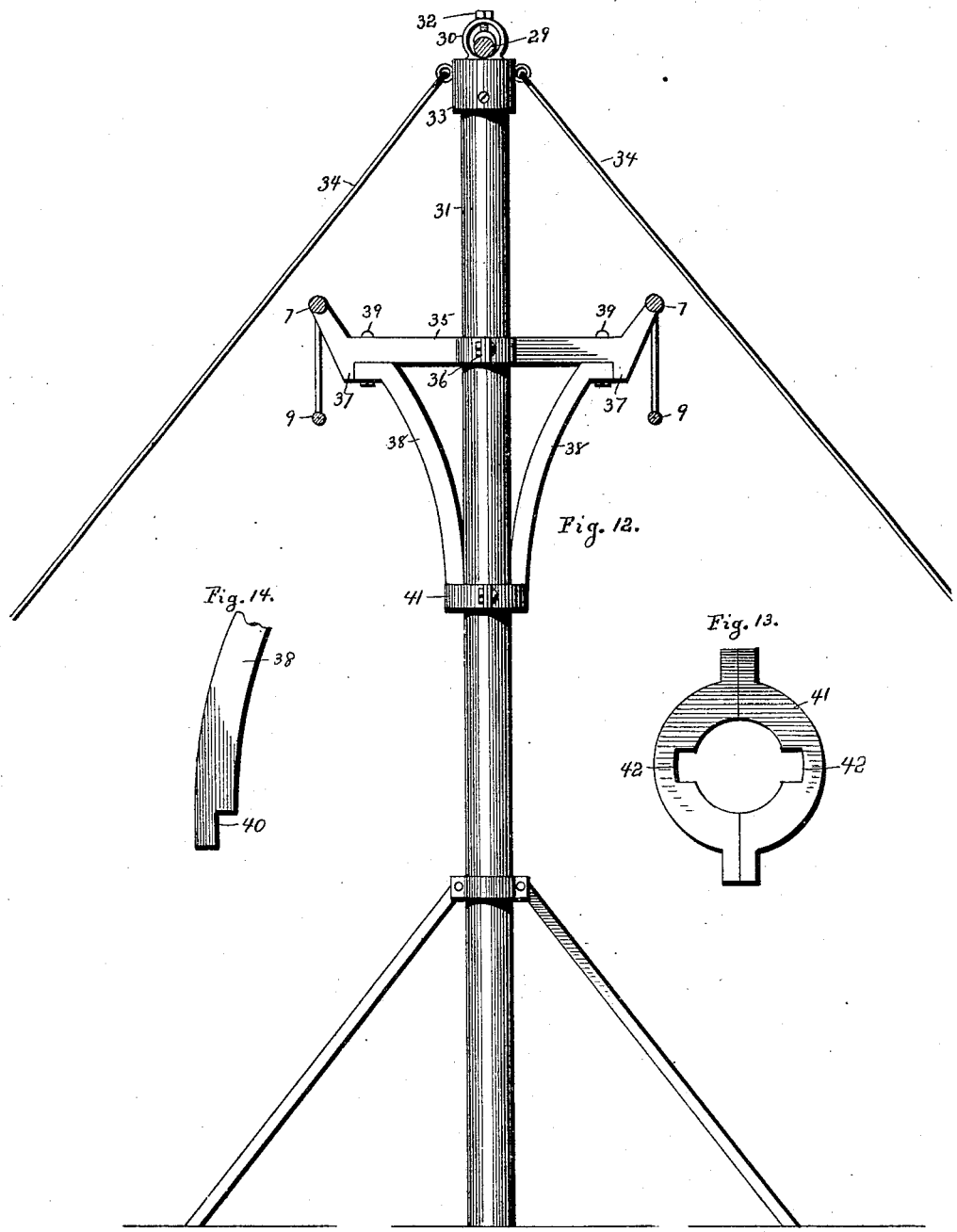
Witnesses
Inventor
George G. Schroeder.
by A. E. Glascock
Attorney No. 841,582. PATENTED JAN. 15, 1907.
G. G. SCHROEDER.
AERIAL SYSTEM FOR MINING PURPOSES.
APPLICATION FILED OCT. 10, 1904. RENEWED JUNE 25, 1906.
9 SHEETS—SHEET 9.
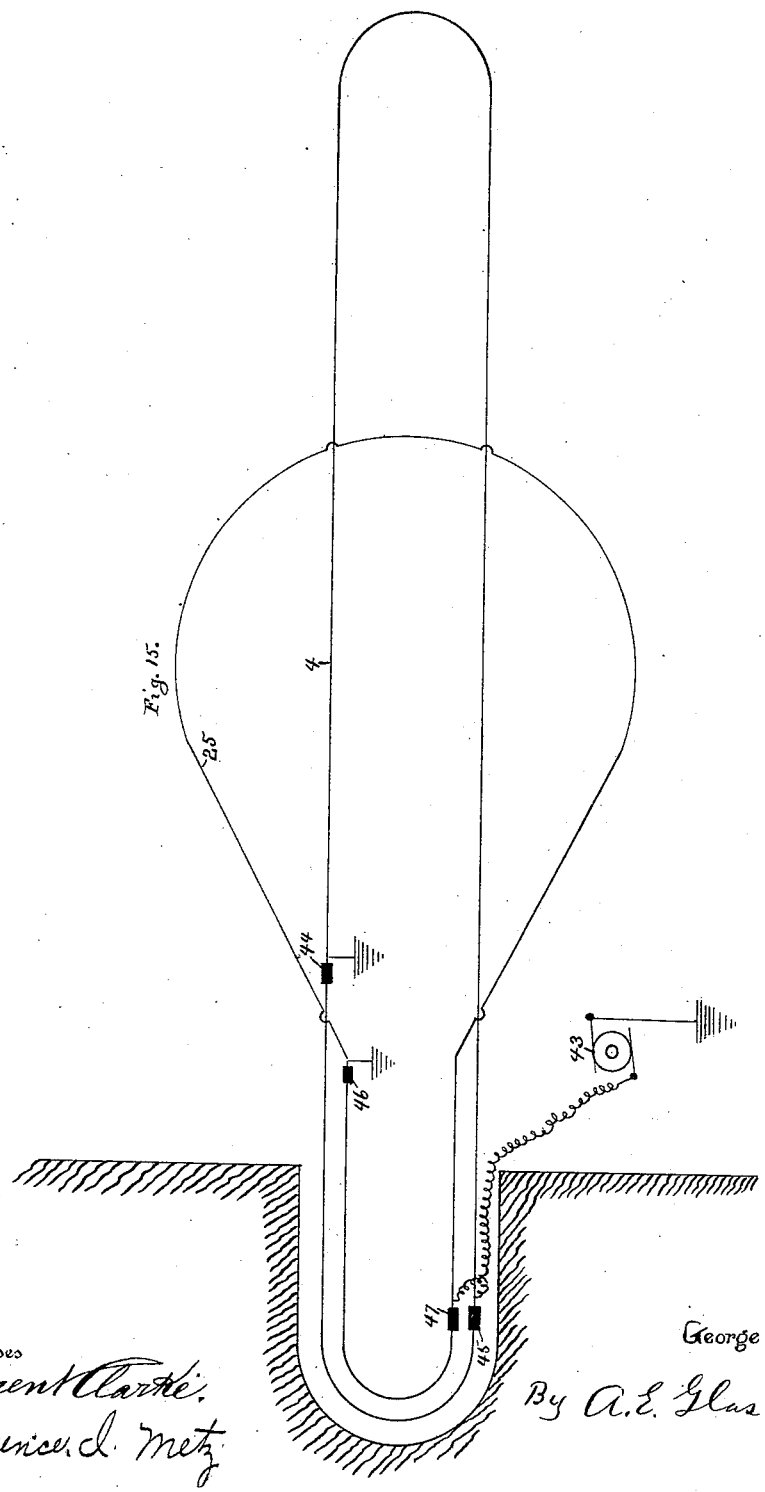
Witnesses
J Brent Clarke
Florence L. Metz
Inventor
George G. Schroeder.
By A. E. Glascock
Attorney

UNITED STATES PATENT OFFICE.

GEORGE G. SCHROEDER, OF WASHINGTON, DISTRICT OF COLUMBIA, ASSIGNOR TO INDUSTRIAL TRANSPORTATION COMPANY, A CORPORATION OF THE DISTRICT OF COLUMBIA.

AERIAL SYSTEM FOR MINING PURPOSES.

No. 841,582.  Specification of Letters Patent.  Patented Jan. 15, 1907.

Application filed October 10, 1904. Renewed June 25, 1906. Serial No. 323,346.

*To all whom it may concern:*

Be it known that I, GEORGE G. SCHROEDER, a citizen of the United States, residing at Washington, in the District of Columbia, have invented new and useful Improvements in Aerial Systems for Mining Purposes, of which the following is a specification.

This invention has relation to aerial systems for mining purposes; and it consists in the novel construction and arrangement of its parts, as hereinafter described.

The object of the invention is to provide a system which is adapted to electrically transport the ores from mines located in inaccessible places to tide water or to railroad facilities.

The system consists of an elevated trackway which is followed by a parallel current-wire. At each end of the system frameworks are erected which form loops, one of which enters the mine, and the other, located at the other end of the system, is used for unloading purposes. The said frameworks are located above the said trackway and are connected with the same by inclined sections. The said sections and framework are followed by parallel guides which are connected to the said current-wire and insulated at proper points therefrom, so that when the carriers pass upon said frames the current to the motor is cut off, the inclined sections operating as brakes to check the speed of the motor.

For the purpose of removing the strippings and other refuse from the mine a supplemental trackway is provided, which forms a loop in the mine and extends outside of the mouth of the same to any convenient point where the said strippings may be dumped. The said supplemental trackway is also provided with a parallel current-wire, which is provided with insulation at suitable points for the purpose of cutting off the current to the motors and enabling them to be stopped for the purpose of loading and unloading.

The carriers on both trackways consist of motors which run thereon, having depending hangers which support pivoted buckets. The hangers are also provided with trolley-wheels which run under the current-wires and take sufficient current therefrom. Said trolley-wheels are electrically connected with the motors, and by this means the electromotive force is conveyed to the said motors.

The system is further provided with special constructions in poles and arms and in guys for bracing the said pole against strain.

Within the mine the supplemental trackway extends parallel and substantially on the same level as the frame connecting the main trackway. Consequently the apparatus is to be elevated sufficiently so as not to interfere with the work of operatives on the floor of the mine. Outside of the mouth of the mine the said supplemental trackway is bowed laterally beyond the said framework, so that the strippings may be carried out and dumped at any convenient point where they will not interfere with the operation of the ore-conveying part of the mechanism.

Figure 2:
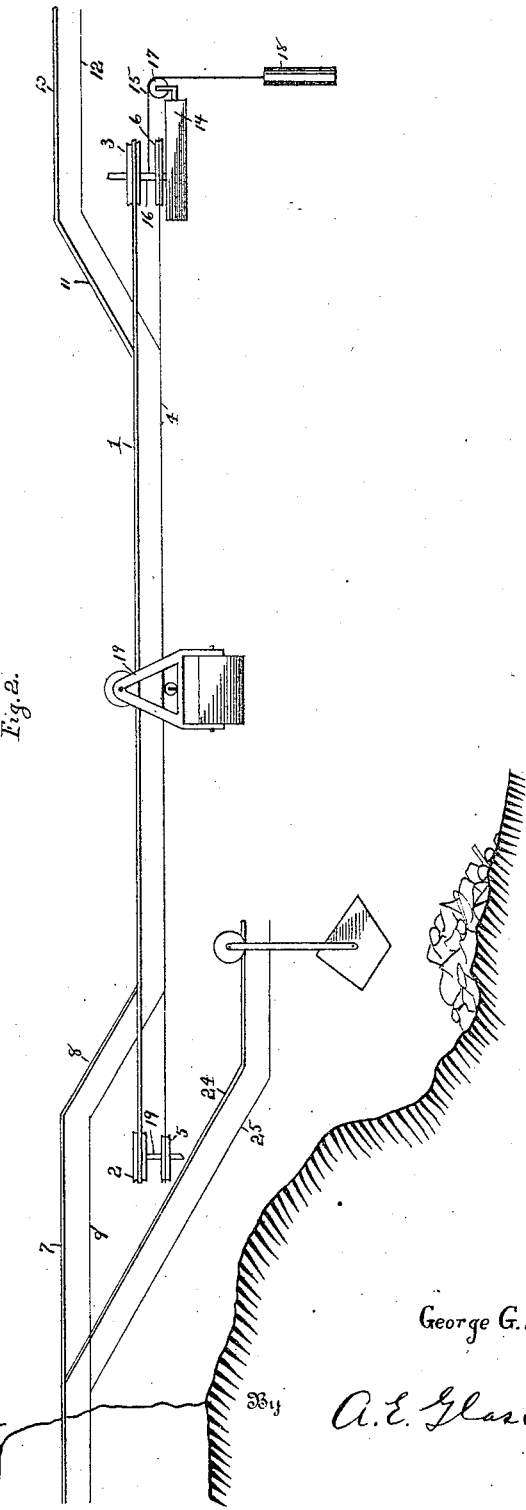
Figure 3:
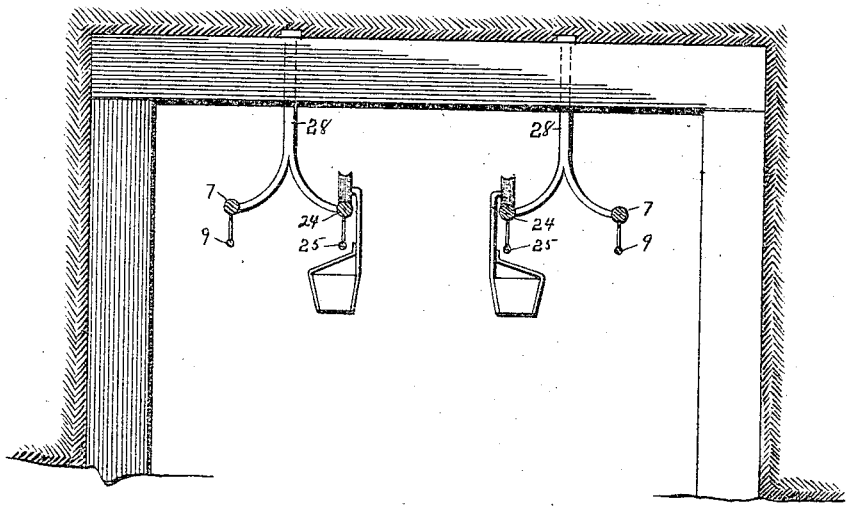
Figure 4:
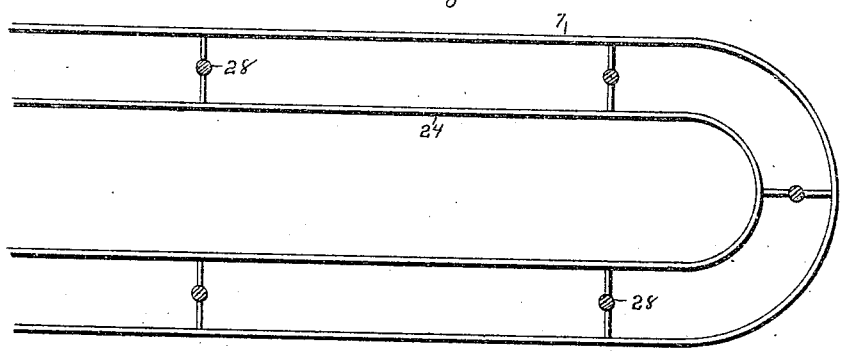
Figure 5:
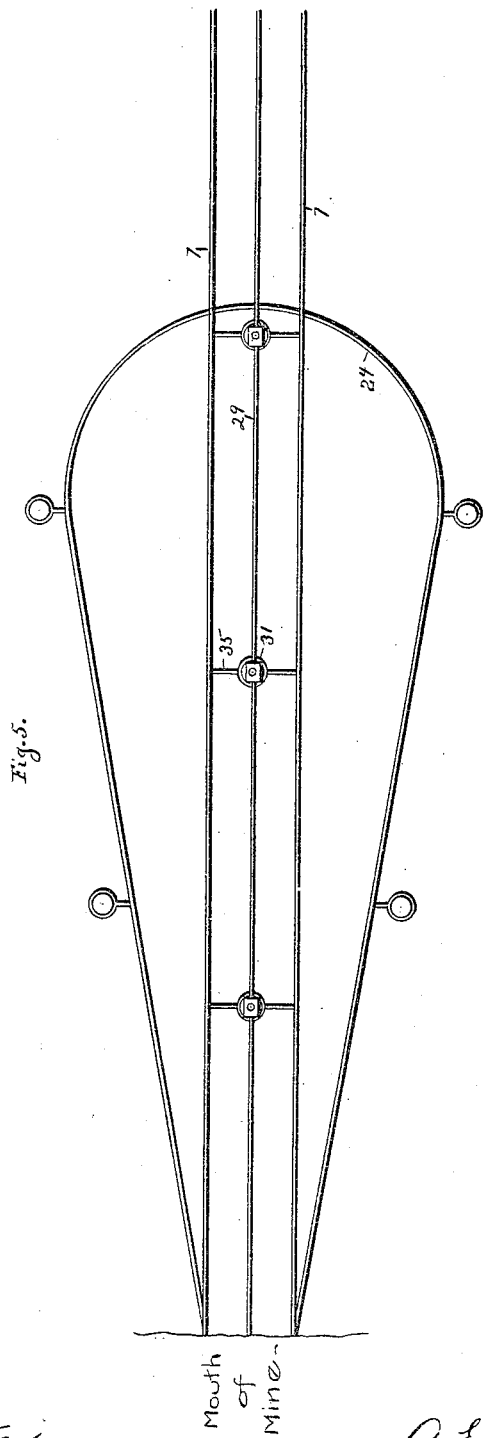
Figure 6:
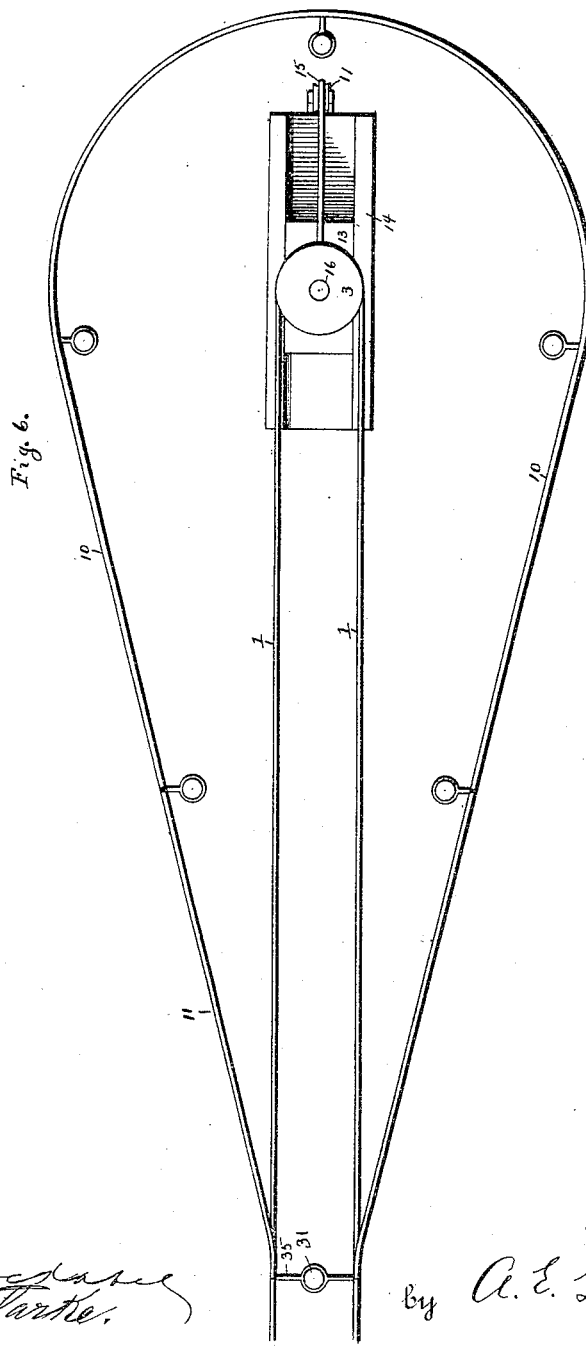

In the accompanying drawings, Figure 1 is a perspective view showing the mouth of the mine with the trackway leading therein. Fig. 2 is a side elevation of the system. Fig. 3 is a transverse sectional view of the mine, showing the arrangement of the trackway therein. Fig. 4 is a top plan view of the trackway located in the mine. Fig. 5 is a top plan view of the trackway just outside of the mouth of the mine. Fig. 6 is a top plan view of the trackway at the end of the system away from the mine. Fig. 7 is a side elevation of the mechanism as shown in Fig. 6. Fig. 8 is an end view of a sliding block and pulleys for keeping the main trackway taut. Fig. 9 is a side elevation of the securing means for the main trackway which is located near the mouth of the mine. Fig. 10 is an enlarged side elevation showing the connection between the main trackway and the framework. Fig. 11 is a transverse sectional view of Fig. 10 cut on the line 11 11 thereof. Fig. 12 is a side elevation of one of the supporting-poles. Fig. 13 is a top plan view of a sectional ring used on the poles. Fig. 14 is a side elevation on the lower end of one of the braces used on the poles, and Fig. 15 is a diagrammatic view showing the electric circuits used in the system.

The main trackway 1 extends from a point near the mouth of the mine to any suitable point at a distance therefrom. Fig. 2 shows the general arrangement of the several trackways. The said trackway 1 is made in the form of a loop having two long parallel sides. The said trackway consists, preferably, of a wire cable. At one end it passes around the fixed pulley 2 and at the other end around the movable pulley 3. The current-wire 4 extends parallel to the trackway 1 throughout. Said wire at one end passes around the insulated pulley 5, which is located under the pulley 2, which is also fixed, while the free end of said wire 4 passes around the insulated pulley 6, which is located under the pulley 3 and is adapted to slide in unison therewith. At each end of the trackway 1 frameworks are erected, which also serve as trackways and are elevated with relation to the trackway 1 and are connected with the same by means of inclined sections. The framework 7 is adapted to enter the mouth of the mine and is connected at its ends with the trackway 1 by the inclined sections 8. The said frame 7 makes a loop within the mine, and the guide 9 connects at its ends with a current-wire 4 and passes into the mine parallel to the frame 7. At the opposite end of the system a similar frame 10 is provided, said frame being connected with the trackway by means of the inclined sections 11. The guide 12 passes under the sections 11 and frame 10 parallel therewith and is connected at its ends to the current-wire 4. The frame 10 describes a loop upon which the cars or buckets may be run from the trackway for the purpose of unloading. The trackway 1 and the current-wire 4 are kept taut by means of a sliding block 13, located in the fixed base 14. The cable 15 is attached at one end to the shaft 16 (or the said cable may be attached directly to the block 13) and passes over the pulley 17 and has attached at its other end the pendent weight 18. It is obvious that the said weight will have the tendency to keep the trackway 1 and the current-wire 4 taut.

As shown in Fig. 9, the end of the trackway 1 passes around the pulley 2. The said pulley is mounted upon the vertical shaft 19, to the upper end of which is secured the guys 20, the lower ends of which are suitably embedded in the ground. Thus the said shaft 19 is held in its proper vertical position. Just beyond the point where the guide 9 connects with the current-wire 4 the said guide is provided with an insulated section 21, which is adapted to prevent the current from passing along the guide 9, but does not interfere with the passage of the current along the wire 4. The lower ends of the rods 22 are attached to the current-wire 4 and the upper ends of said rods are attached to the insulators 23, which are located against the under side of the track 1. Thus the current-wire 4 is held in horizontal relation with the track 1. The wheels of the cars or carriers run upon the track 1, while the trolley-wheel of the said conveyance runs along the under surface of the wire 4.

At the mines a supplemental trackway 24 is provided for the purpose of running cars or carriers upon to remove the strippings or other refuse from the mines. The trackway 24 makes a suitable circuit outside of the mouth of the mine, but does not extend the entire length of the trackway 1. Upon the said trackway 24 cars or carriers bearing the strippings or refuse may be run, and when they arrive at any suitable point outside of the mouth of the mine the said strippings or refuse may be dumped. The current-wire 25 extends under the supplemental trackway 24 parallel thereto and is for the purpose of conducting the current to the conveyance traveling upon the supplemental trackway 24. Inside of the mouth of the mine the trackway 24 passes between the frame 7 and describes the loop, as shown in Fig. 4. The trackway 24 is at substantially the same height as the frame 7, and the said trackway and said frame are supported by the hangers 28, extending down from the roof-timbers of the mine. Outside of the mouth of the mine the trackway 24 describes the loop which extends on each side laterally beyond the frame 7, so that the refuse may be dumped at points to one side or the other of the main trackway without interfering with the operation of the cars or carriers thereon. The guy-cable 29 is attached at one end to the ground, preferably above the mouth of the tunnel, as shown in Fig. 1, and passes through eyes 30, located at the top of each of the poles 31, and is secured in said eyes by means of the set-screws 32. Thus the upper ends of the poles 31 are supported and held against tilting in the line of travel of the cars or carriers.

The poles 31 are provided with caps 33, to which are secured the upper ends of the guys 34. The lower ends of the said guys are suitably secured to the ground. The cross-arm 35 is made in two sections, each having an inner end which passes half-way around the pole 31, which are bolted together, as at 36. The frame 7 and the track 1 are supported at the outer ends of the arm 35. Each section of the said arm is provided near its outer end with an under lug 37. The upper ends of the braces 38 bear against the rear sides of the lugs 37 and are bolted to the arm-sections, as at 39. The lower ends of the braces 38 are notched, as at 40. The ring 41, made in two sections, is secured to the pole 31 at a suitable distance below the frame 35. Each section of said ring is provided with a recess 42. Each said recess is adapted to receive the lower notched end 40 of the brace 38. Thus the braces are held together and may be easily and readily assembled or taken apart.

In Fig. 15 of the drawings is shown a diagrammatic view of the arrangement of the current-wires. 43 represents a generator, which is electrically connected with the current-wires 4 and 25. The current-wire 4 is provided with an insulated section 44, preferably located just outside of the mouth of the mine, so that the current will be cut off from the cars or carriers as they enter the mine, where they may be stopped for loading. The said wire 4 is also provided with an insulated section 45, which is preferably located within the mine just beyond the point where the loading of the cars takes place. After the car is loaded it is pushed along the frame until the trolley-wheel passes the insulated section 45, when the car or carrier takes up the current and speeds along the track, being supplied by the current from the wire 4. The current-wire 25, preferably at a point just outside of the mouth of the mine, is provided with an insulated section 46, which is adapted to cut the current off from the car or carrier conveying the strippings or refuse, and at a point within the mine the said current-wire 25 is provided with an insulation 47, which after it has been passed over by the car or carrier conveying the strippings or refuse permits the current to pass through the motor of said car or carrier from the current-wire 25.

The cars or carriers used throughout this system are of the ordinary type generally used for such purposes. Each is preferably fitted with a tilting bucket which acts as a receptacle for the ore or refuse. Each car is provided with a motor and a trolley-wheel with suitable connection between it and the motor, whereby the current is conveyed from the current-wire to the motor.

Having described my invention, what I claim as new, and desire to secure by Letters Patent, is—

1. A system such as described consisting of an elevated trackway which enters the mouth of a tunnel and turns therein, and extends out at the mouth of the tunnel, and a loop formed at the other end of the system, and a supplemental elevated trackway which also enters the mouth of the tunnel, and makes a turn therein, and extends out at the mouth of the tunnel, and forms a loop just outside the mouth of the tunnel.

2. A system such as described consisting of an elevated trackway entering the mouth of a tunnel, poles supporting said trackway and a guy-cable attached at one end to the ground above the mouth of the tunnel, and being connected to all of said supporting-poles, and being fixed at its other end.

3. A system such as described consisting of an elevated trackway entering the mouth of a tunnel and making a turn therein, and extending out at the mouth of the tunnel, a supplemental trackway also entering the tunnel and extending therein parallel to the first said trackway and formed in a loop just outside of the mouth of the tunnel.

4. A system such as described consisting of an elevated trackway entering the mouth of a tunnel and making a turn therein, and extending out at the mouth of the tunnel, a supplemental trackway also entering the tunnel and extending therein parallel to the first said trackway, hangers located within the tunnel and operating to support both said trackways, the last said trackway being formed in a loop just outside of the mouth of the tunnel.

5. A system such as described consisting of an elevated trackway entering the mouth of a tunnel and making a turn therein, and extending out at the mouth of the tunnel, a supplemental trackway also entering the mouth of the tunnel and extending therein parallel to the first said trackway, but being located between the incoming and outgoing sides thereof, said supplemental trackway forming outside of the mouth of the tunnel, a loop which extends laterally beyond the line of the first said trackway.

6. A system such as described consisting of an elevated trackway having a means for maintaining the same under tension, and a terminal framework connected said trackway and entering a tunnel and forming a loop therein.

7. A system such as described consisting of an elevated trackway having a means for maintaining the same under tension, a frame connected at both ends to said trackway and entering a tunnel and forming a loop, and a second frame located at the other end of the trackway and connected said trackway at both ends and forming a loop.

8. In a system such as described, an elevated trackway, a current-wire extending parallel to the same, a frame connected at both ends to the said trackway and forming a loop in a tunnel, a guide extending parallel to said frame, and being connected at both ends to said current-wire, and being insulated from the same at one end, and at a point within the tunnel.

9. A system such as described consisting of an elevated trackway, a current-wire extending parallel to said trackway, a frame connected at both ends to said trackway, and entering the mouth of a tunnel, a guide extending parallel to said frame and connected at its ends to said current-wire, and being insulated from the same near one end, and at a point within the tunnel, a supplemental trackway also entering said tunnel, and having a guide extending parallel therewith, said guide being insulated at a point outside the mouth of the tunnel, and at a point within the tunnel.

10. In a system such as described, a pole, arms extending from said pole, and having bifurcated ends which surround the pole, and are attached together, and braces engaging the pole at their lower ends, and said arms at their upper ends.

11. In a system such as described, a pole, arms extending from said pole and having bifurcated ends which surround the pole and lugs near their outer ends, braces passing behind said lugs at their upper ends and engaging the pole at their lower ends.

12. In a system such as described, a pole, arms extending from said pole and having bifurcated ends which surround the pole, and are bolted together, braces engaging said arms at their upper ends, and the pole at their lower ends.

13. In a system such as described, a pole, arms extending from said pole and having under lugs, braces engaging said arms behind said lugs, a ring attached to said pole and having recesses for the lower ends of said arms.

14. In a system such as described, a pole having arms extending therefrom, braces attached at their upper ends to said arms, a ring made in two halves and clamped together about said pole, each half of the ring having a recess for the reception of the lower end of said arm.

In testimony whereof I affix my signature in presence of two subscribing witnesses.

GEORGE G. SCHROEDER.

Witnesses:
ARTHUR L. FILL,
BARTON E. BROOKE.